Aug. 13, 1963 D. E. SOLAND 3,100,874

AUTOMATIC FREQUENCY-TRACKING FILTER

Filed July 1, 1959 4 Sheets-Sheet 1

Duane E. Soland Inventor

By James E. Reed Attorney

Aug. 13, 1963 D. E. SOLAND 3,100,874

AUTOMATIC FREQUENCY-TRACKING FILTER

Filed July 1, 1959 4 Sheets-Sheet 2

Duane E. Soland Inventor

By James E. Reed Attorney

Duane E. Soland Inventor
By James E. Reed Attorney

Duane E. Soland Inventor

By James E. Reed Attorney

United States Patent Office 3,100,874

Patented Aug. 13, 1963

3,100,874
AUTOMATIC FREQUENCY-TRACKING FILTER

Duane E. Soland, Tulsa, Okla., assignor to Jersey Production Research Company, a corporation of Delaware Filed July 1, 1959, Ser. No. 824,386
10 Claims. (Cl. 328—165)

The present invention relates to the frequency analysis of electrical transcients and more particularly relates to methods and apparatus for filtering complex electrical transients having widely varying frequency characteristics. In still greater particularity, the invention relates to an improved electronic filter adapted to sense changes in the dominant frequency of an input signal having widely varying frequency characteristics and to vary the frequency response of the filter continuously in order to pass the dominant signal frequency while excluding undesired side frequencies.

In the processing and analysis of information represented by electrical signals, it is sometimes necessary to segregate phenomena which can be identified by their frequency characteristics from unrelated phenomena having different frequency properties. This is often done, for example, in studying and analyzing signals used in automatic control systems, signals employed in communications networks, and signals obtained during seismic prospecting for subterranean minerals. Separation of the dominant frequencies from associated frequencies in such signals is a relatively simple matter when the dominant frequency is essentially constant or varies over a comparatively narrow range. More serious problems are encountered, however, in situations where the dominant frequency of the input signal varies over extremely wide ranges. The band pass filters used in frequency spectrum analysis systems applied to signals in which the dominant frequency remains relatively constant are generally unsatisfactory for use with signals characterized by dominant frequencies of widely varying values. Filter circuitry having band pass characteristics sufficiently broad to permit passage of the entire dominant frequency in a signal of the latter type also permits the passage of a broad spectrum of associated frequencies bearing little relationship to the dominant frequency. The use of a plurality of sharply peaked filters having narrow band pass characteristics in parallel, the usual method of frequency spectrum analysis applied to signals wherein the dominant frequency varies over a broad spectrum, has not proved entirely satisfactory because of difficulties in selecting and utilizing the proper filter output signal. Methods for continuously monitoring the dominant frequency in the input signal with conventional apparatus and varying the band pass characteristics of the filter circuitry have been suggested from time to time but generally involve expensive and time-consuming operations.

The present invention provides an improved electronic filter which permits isolation of the dominant signal frequencies from a complex electrical signal without the difficulties which have characterized methods and apparatus employed for this purpose in the past. In accordance with the invention, it has now been found that a narrow frequency spectrum containing the dominant frequency of an input signal of widely varying frequency characteristics can be obtained by sampling the input signal voltage at delayed time intervals whose frequency is proportional to the dominant input signal frequency and thereafter weighting and recombining the delayed voltage samples in accordance with the desired filter output response.

The method of the invention involves superposition of all of the past time values of the input signal, weighted in terms of their effect at a later time. Such an operation is referred to as a time domain operation in order to distinguish it from the filtering action of ordinary tuned circuit filters which depend upon the superposition of frequency effects. The method can be better understood by briefly considering the relationship of time and frequency in a frequency selective electrical system.

Any periodic electrical transient serving as an input signal to a system can be broken down into its various components, the fundamental frequency and the harmonics, by means of the Fourier series. By then determining the system effect upon each of these individual frequencies present at the input and adding all the individual responses at the output, the total response at the output can be determined. If the input signal is nonperiodic, rather than periodic, it becomes necessary to employ the Fourier integral in order to specify the frequency spectrum of the input signal. This is, in effect, a superposition of frequency effects.

Every input electrical signal which can be expressed as a function of frequency can also be expressed in corresponding terms as an equivalent function of time. In like manner, the network function of any system as a function of frequency has its equivalent function of time which also defines the characteristics of the network. It can be shown mathematically that the network function of a system with respect to time is the output response of the system when the input signal in terms of frequency is unity. The input time function to the system which makes the input frequency function unity is known as the Delta or Dirac function and is defined as an impulse function having an infinitesimally narrow width and infinite height, so that the product is unity. Although such a function cannot be exactly produced, it can be closely approximated. Since all physical systems are band limited and cover only a lower portion of the frequency range, it is only necessary that the input impulses be of short enough duration to have frequency components over and above the low pass limits of the system. The response of the system when such a short duration pulse is applied to the input is then the network function in terms of time.

Knowledge of the input function and the network function of a system in terms of time permits determination of the output response of the system without transposition to the frequency domain. Each impulse applied to the system causes the initiation of an individual impulse response whose characteristics are determined by the network function of the system. After several such impulses have been applied to the system, the resulting output response at any later time can be determined by totalling the effects of all impulses which have occurred up to that time. If the individual impulses are brief enough, the output response can be considered to be the integral of the input function between limits of plus and minus infinity multiplied by the input impulse response shifted in time and reversed in direction. This results in superposition of all of the impulse responses that have resulted from impulses in past time.

This superpositioning of impulse responses is performed in accordance with the present invention by extracting voltage samples from the input signal at delayed time intervals whose frequency exceeds the greatest frequency in the input signal, weighting those samples by the impulse response necessary to give the desired filter characteristics, and thereafter mixing the weighted components to produce a composite, filtered signal.

Selection of the weightings applied in this system to the delayed voltage samples so that they correspond to the network function of a filter having desired band pass characteristics results in an output signal analogous to that which would be obtained if the input information were passed through a conventional tuned circuit filter.

Changes in the dominant frequency of the input signal are compensated for in accordance with the invention by varying the frequency with which voltage samples of the input signal are taken with variations in the dominant frequency. By thus maintaining the sampling frequency proportional to the dominant input signal frequency, the network response represented by the weightings applied to the delayed voltage samples is continuously and automatically varied with respect to time so that the filter band pass spectrum is always centered on the dominant frequency of the input signal. This permits the filtering of signals in which the dominant frequency varies widely without losses in frequency discrimination and without the difficulties encountered with systems employing multiple filters in the past.

The apparatus utilized in carrying out the invention normally comprises a frequency modulation discriminator or other circuitry adapted to produce a voltage which is linearly proportional to the dominant frequency of the input signal, a multivibrator or similar source of pulses whose frequency is proportional to the voltage from the discriminator, a sequence-operated counting circuit responsive to the pulses for governing the rate and order of sampling, a plurality of sample-and-hold circuits sequentially responsive to impulses passed by the counting circuit for taking and holding voltage samples, circuitry for passing the input signal through the sample-and-hold circuits in series, delay taps which permit the recovery of delayed signals from the sample-and-hold circuits, and weighting and mixing resistor elements which can be used to apply the desired network function to the delayed samples. Conventional components recognizable by those skilled in the electronics art and readily available from commercial sources can be assembled in accordance with the invention and utilized for the purposes thereof.

The exact nature and objects of the invention can best be understood by referring to the following description of the method and apparatus employed in its practice and to the accompanying drawing in which:

FIG. 1 schematically represents an automatic frequency tracking filter embodying the principles of the invention;

Figure 1:
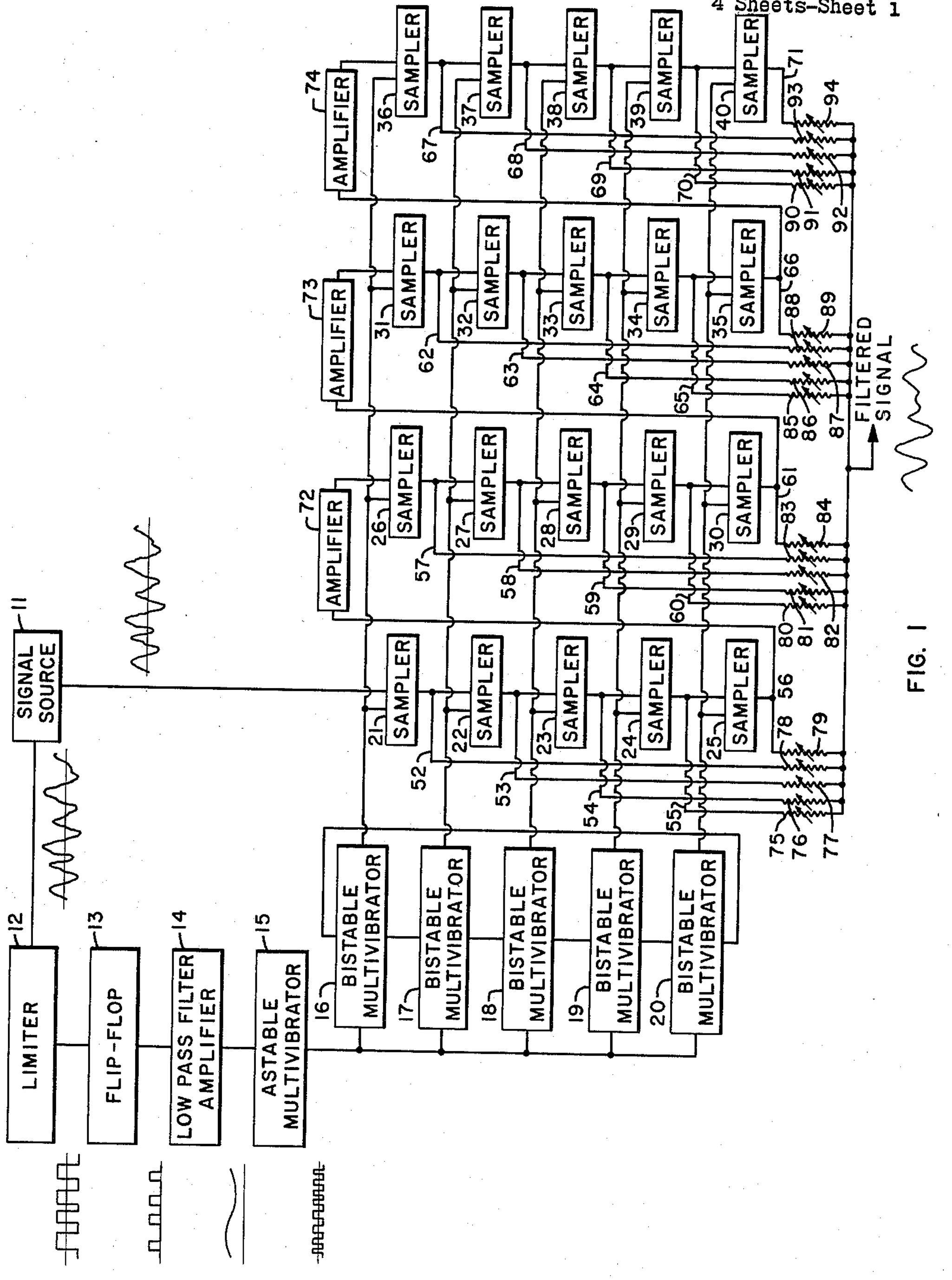

Turning now to FIG. 1, reference numeral 11 designates a source of complex electrical transients to be filtered in accordance with the invention. Normally, for the sake of convenience, source 11 will consist of a wire or tape recording of the signal to be filtered and associated playback equipment but in some instances it may be desirable to apply the signal to the filtering system directly from the electrical or electronic device in which this signal is produced. Such a device might, for example, comprise a geophone used in seismic prospecting or a control system used in missile guidance. Normally the signal emitted from source 11 will be one in which the dominant frequency varies widely but it will be understood that the apparatus disclosed is not limited to use in conjunction with such signals and may be employed to filter other complex electrical transients. The input signal thus obtained is simultaneously fed into the control section of the apparatus and into the first of a series of sampling circuits.

The control section of the apparatus shown in FIG. 1 comprises a frequency modulation discriminator, an astable multivibrator or similar pulse generator, and a sequence-operated counting circuit. The frequency modulation discriminator of the apparatus shown in the drawing consists of limiter 12, flip-flop 13 and low pass filter amplifier 14. Limiter 12, a transducer whose output is constant for all inputs above a critical value, converts the input signal fed thereto into a series of pulses of constant amplitude whose frequency is the same as that of the input signal. These pulses are then fed into flip flop 13, which is a conventional monostable multivibrator having one stable state and one unstable state. Such multivibrators operate for a predetermined period in response to each pulse in the incoming signal. They are also referred to as one-shots or start-stop multivibrators. The output signal from flip flop 13 consists of a series of pulses of equal duration whose duty cycle is proportional to the dominant frequency of the input signal fed to the system. The pulse duration will be determined by the timing waveform of the flip-flop. These pulses are then fed into low pass filter amplifier 14 where they are used to generate a signal whose voltage is proportional to the pulse frequency and hence proportional to the dominant frequency of the original signal. This signal then passes to an astable multivibrator 15 wherein a series of pulses whose repetition rate is proportional to the applied voltage are generated. The frequency of the pulses generated by multivibrator 15 in response to a given voltage from filter amplifier 14 can be controlled by varying the repetition rate of the multivibrator. As will be pointed out later, the minimum frequency of the pulses from multivibrator 15 depends somewhat upon the sequence-operated counting circuit utilized in the apparatus and the applications for which the apparatus is intended.

Electrical impulses emitted by astable multivibrator 15 are fed to a multi-state, sequence-operated counting circuit, shown in FIG. 1 as a sequence-operated ring counter. The ring counter depicted is made up of interconnected bistable multivibrators 16, 17, 18, 19 and 20 which serve as gate generators to control the operation of the sampling circuit utilized in the apparatus of the invention. The multivibrators are conventional circuits having two stable states which complete one cycle for each two impulses received. Such circuits are commonly referred to as trigger circuits, Eccles-Jordan circuits, or scale-of-two circuits. Each multivibrator operates in sequence as it receives an impulse from astable multivibrator 15 and an impulse from the multivibrator preceding it in the ring counter. The output from each multivibrator consists of positive and negative impulses which are used to trigger the operation of the sampling circuits of the apparatus. It will be understood that the use of a ring counter may be dispensed with in favor of other sequence-operated counting devices. Gas-filled counting tubes such as the "Dekatron" and suitable auxiliary circuitry, mechanical commutator switches, and numerous other sequence-operated counting devices can be employed in lieu of the ring counting circuitry shown in FIG. 1. Such counting devices are widely used in radar systems, coder and de-coder devices, and many other applications and hence are well known in the art.

One or more sample-and-hold circuits, designated by reference numerals 21 through 40 in FIG. 1, is controlled by the output from each multivibrator in the ring counter circuit or similar sequence-operated counting device utilized in the apparatus. These sample-and-hold circuits may consist essentially of two cathode follower stages which are activated upon receipt of positive and negative gating pulses from the appropriate multivibrator in the counting circuit. Each sample-and-hold circuit samples the voltage of the input signal applied to it and holds that voltage for a discrete period of time, after which voltage is again sampled and held. The frequency with which sampling occurs is determined by the frequency of the positive and negative impulses from the multivibrator through the sample-and-hold circuit. Although a total of 20 sample-and-hold circuits are shown in the apparatus of FIG. 1, it will be understood that a greater or lesser member of sampling circuits may be provided, depending upon the total period over which the input signal is to be delayed in the filtering operation. It has been found that for some filtering applications in which the method and apparatus of the invention are particularly useful, 250 or more separate sampling stages may be used. It may in some instances be desirable to arrange the sampling stages in banks which can be interconnected to produce a long delay line when a filtering operation requiring greater frequency discriminaiton is to be carried out or may be disconnected when only a short delay line is required for a filtering operation with relatively little frequency discrimination.

Figure 2:
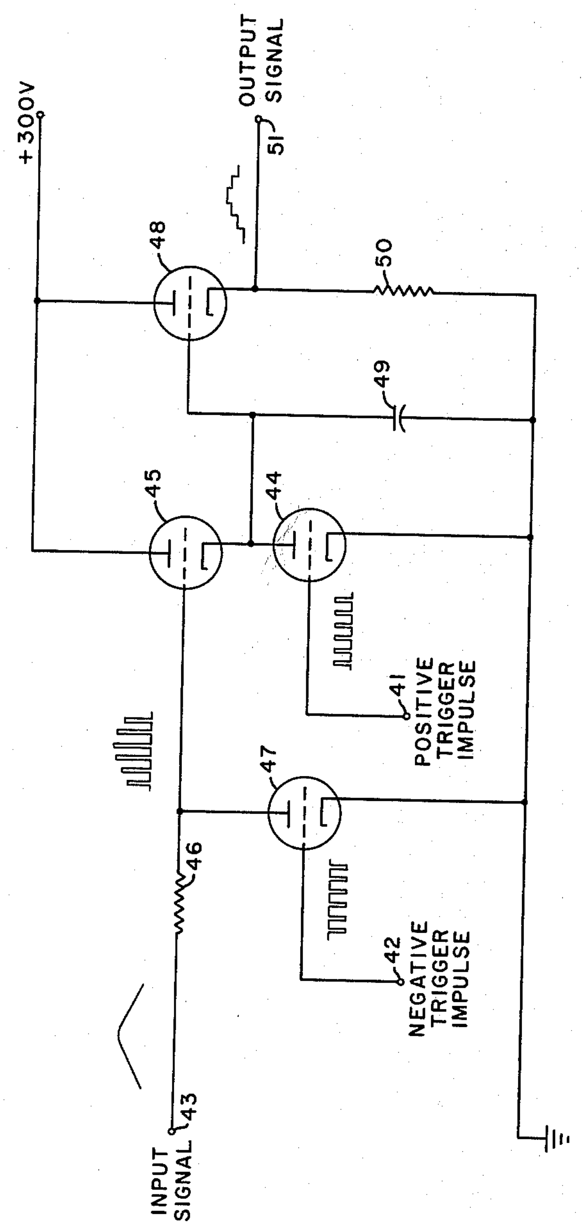
FIG. 2 is a circuit diagram of a sample-and-hold circuit suitable for use in the apparatus depicted in FIG. 1.

The operation of the sample-and-hold circuits employed in the apparatus of FIG. 1 can be better understood by referring to FIG. 2 of the drawing which is a schematic diagram of this circuit. As can be seen from FIG. 2, each voltage sampling circuit employs four triodes, two resistors and a capacitor. Two of these triodes, triodes 44 and 47, might readily be replaced by diodes and appropriate control circuitry. Transistors might also be employed in place of electron tubes. The sampling action is activated by the simultaneous application of positive and negative gate pulses from the multivibrator connected to the sampling circuit. The triggering impulses are fed to positive gate terminal 41 and negative gate terminal 42 in the sampling circuit. Since the apparatus of FIG. 1 employs a five-stage ring counting circuit, the ratio of the length of the impulses to the interval between impulses in the gating signals will be 1:4.

The input signal to be sampled by the sample-and-hold circuit depicted in FIG. 2 of the drawing is fed into the circuit through terminal 43. Prior to the arrival of the input signal, triodes 44 and 45 are held cut off, triode 44 by the positive gate signals applied at terminal 41, and triode 45 by the drop across resistor 46 due to current flow through triode 47. Triode 48 provides a low impedance replica of the voltage on storage condenser 49. When the input signal to be sampled arrives at the sampling circuit, triode 47 is cut off, allowing the voltage on the grid of triode 45 to rise to the level of the input signal. Simultaneously, triode 44 is turned on, providing a cathode resistor for triode 45. Storage capacitor 49 is therefore charged to the new signal level. Immediately after the sample is stored on capacitor 49, triode 47 is turned on and triode 44 is cut off. This leaves capacitor 49 free floating, holding the grid of triode 48 at signal level. Triode 48 with cathode resistor 50 provides a low impedance output source at terminal 51 for the storage capacitor signal. The output signals from the voltage sampling circuit is thus a stair-step representation of the input signal applied to the circuit. The output signal serves as the input signal for the succeeding sampling circuit. It will be understood that the sampling circuit thus described is merely representative of circuitry useful to practicing the invention and that the invention is not limited to the use of any particular sample-and-hold circuit. A number of other sampling circuits which might be employed in the apparatus of the invention with minor and obvious modifications are described in chapter 14 of "Waveforms" by Chance et al., volume 19 of the Massachusetts Institute of Technology Radiation Laboratory Series, published by the McGraw-Hill Book Company of New York.

The input signal to be filtered by means of the apparatus shown in FIG. 1 is fed into the system from signal source 11 in FIG. 1. As mentioned earlier, this signal source will ordinarily constitute a magnetic tape or similar reproducible record and associated playback equipment but other signal sources may be utilized. Reproducible records are particularly preferred in seismic filtering applications of the invention. The input signal from source 11 is fed into sampling circuit 21 where a stair-step representation of the signal is produced in the manner described in the preceding paragraphs. The operation of sampling circuit 21 is controlled by impulses from bistable multivibrator 16. The resultant stair-step waveform is then passed to sampling circuit 22 where, in response to positive and negative impulses from bistable multivibrator 17, it is sampled and held at the same frequency but at intervals displaced in time from the sampling interval in the preceding sampling circuit. A sample of the stair-step output of sampling circuit 21 is recovered by means of delay tap 52. In similar manner,, the input signal proceeds through the bank of sampling circuits. The output of each sampling circuit serves as the input for the succeeding circuit. A delay voltage sample is recovered from each circuit and taken off through delay taps 52 through 71. Each voltage sample thus recovered is delayed from that preceding it by a discrete time increment. Since the operation of the sampling circuits is governed by the multivibrators in the sequence operating counting circuitry and since the ring counter is operated at a rate proportional to the dominant frequency of the input signal, the time increments separating the voltage samples are inversely proportional to the dominant frequency of the original signal.

Figure 3:
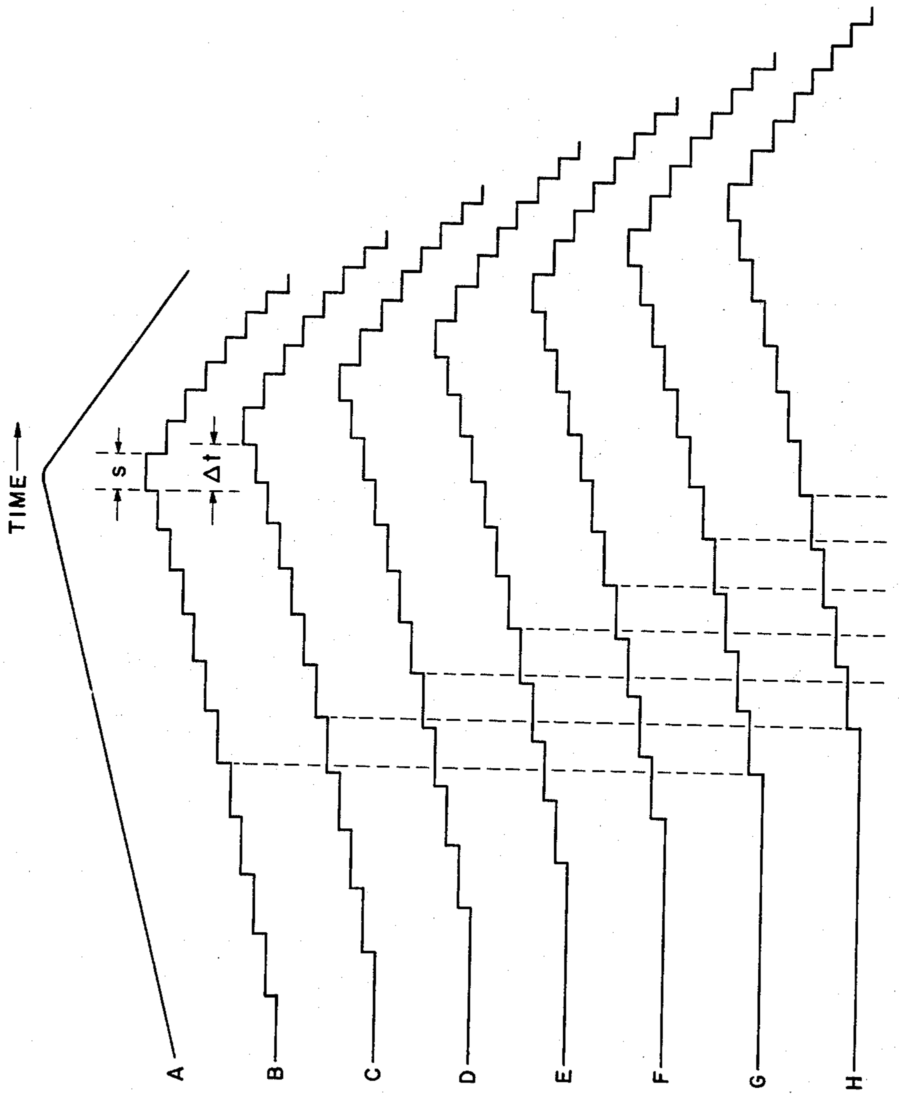
FIG. 3 is a graphical representation of waveforms produced during the operation of the apparatus shown in FIG. 1; and, FIG. 4 depicts waveforms useful in understanding the operation of the apparatus.

The production of the voltage samples in carrying out the invention can best be understood by examining the waveforms produced during that stage of the operation. Turning now to FIG. 3 of the drawing, the input signal fed from source 11 into sampling circuit 21 is represented by waveform A of FIG. 3. The stair-step waveform produced in sampling circuit 21 by sampling the input signal at time intervals inversely proportional to the frequency of the input signal and thereafter holding each voltage sample constant until the suceeding sample is taken is shown as waveform B. This waveform consists of a series of constant voltages and closely resembles the input signal. As can be seen from the drawing, the frequency with which the samples are taken is considerably higher than the frequency of the input signal. The sampling frequency should exceed the highest frequency in the input signal by a factor of at least two and will preferably be four or more times greater than the highest input signal frequency. Waveform B is then fed into sampling circuits 22 where it is again sampled at a frequency proportional to the frequency of the dominant component of the input signal. Due to the time lag between the pulses emitted by bistable multivibrator 16 and those emitted by bistable multivibrator 17, sampling in sampling circuit 22 occurs at a discrete time interval after sampling takes place in the prior sampling circuit 17. A second stair-step waveform displaced from the first by a time period $\Delta T$ is thus produced. $\Delta T$ constitutes the delay period between sampling stage 21 and sampling stage 22 and is ultimately determined by the dominant frequencies of the original input signal. Similar stair-step waveforms, each delayed from the preceding waveform by a time period $\Delta T$ which will vary with variations in the dominant frequency, are produced in the succeeding sampling circuits. These are shown in FIG. 3 as waveforms C, D, E, F and the like. The total period which the last delayed voltage sample obtained through delay tap 71 is delayed from the first sample obtained through delay tap 52 is the sum of the delay periods between the individual sampling stages.

Since sampling circuits 21, 26, 31 and 36 in the apparatus of FIG. 1 are triggered by impulses from bistable multivibrator or gate generator 16 at the same time, these sampling circuits operate in unison. In like manner, each of the other bistable multivibrators in the ring counter shown triggers four sampling circuits. Every fifth sampling circuit thus samples at the same time and therefore the delay period for each sampling circuit or stage will be four-fifths of the sampling period at any given instant. The sampling period, designated by the letter S in FIG. 3 of the drawing, is measured in seconds per cycle and is the reciprocal of the sampling frequency in cycles per second. The delay period, designated by $\Delta T$ in FIG. 3 of the drawing, is the period between the time that a sample is taken in one sampling circuit and the time that a sample is taken in the next succeeding sampling circuit.

As pointed out previously, the sampling frequency is determined by the frequency of the impulses fed to the counting circuit from astable multivibrator 15 and will vary with variations in the frequency of the original input signal to the system. The relationship between the sampling period and the delay period will be the same for any apparatus employing a five-stage sequence-operated counting circuit. The relationship may be changed by changing the number of stages in the counting circuit. In a ring counter employing four bistable multivibrators or gate generators, for example, every fourth sampling circuit in the series would be triggered simultaneously and hence the delay period would be three-fourths of the sampling period. It is thus obvious that the relationship between the delay period $\Delta T$ and the sampling period S is governed by the counting circuitry used to control the sampling circuits and that the apparatus of the invention is not limited to the use of the five-stage ring counter or similar sequence-operated counting device as depicted in FIG. 1 of the drawing.

The input signal shown as waveform A in FIG. 3 of the drawing is, as can be seen from the drawing, a signal which is increasing in frequency with time. This increase in frequency results in an increase in the repetition rate of the impulses fed from astable multivibrator 15 into the counting circuitry made up of multivibrators 16 through 20. Due to the increase in pulse rate as the frequency of the original input signal increases, the sampling frequency increases. This increase in sampling frequency is also shown in FIG. 3. It is this change in sampling rates with changes in the frequency of the input signal to the system which is responsible for the tracking action of the filter. This tracking action will be more fully explained hereafter.

As pointed out heretofore, the sample- and-hold circuits shown in FIG. 2 of the drawing essentially involve two cathode follower stages. When a sampling device of this type is utilized, the amplitude of the output signal from each sampling circuit is somewhat lower than that of the input signal. In order to compensate for this loss in signal level, and to maintain a reasonable operating level, booster amplifiers may be provided at periodic intervals in the system. Conventional amplifiers requiring only a small amount of gain may be employed for this purpose and may be heavily fed back in order to maintain stability throughout the amplified portion of the circuit. Amplifiers 72, 73 and 74 are provided for this purpose in the apparatus shown in FIG. 1 of the drawing.

The delayed voltage samples obtained as described in the preceding paragraphs are filtered in accordance with the invention by weighting and mixing the signals obtained from each of the sampling circuits. The delayed outputs recovered through delay taps 52 through 71 in FIG. 1 of the drawing are passed through series resistors 75 through 94 and mixed to produce a filtered output signal. In lieu of the variable resistors shown in FIG. 1 of the drawing, weighting and mixing may be achieved by connecting the delayed signals through series resistors to the appropriate points in a mixing resistor string. The series resistors employed will preferably be made somewhat larger than the mixing resistors in the string in order to prevent interaction of the weightings. Other mixing and weighting methods employed heretofore in conjunction with time domain filter apparatus may also be utilized.

Figure 4:
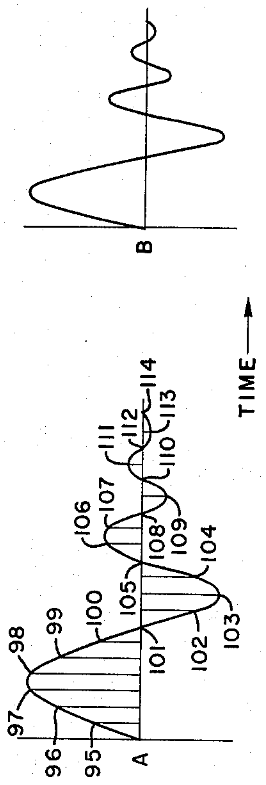

The effect of weighting and mixing the delayed output signals obtained through the delay taps 52 through 71 in FIG. 1 of the drawing can best be understood by referring to FIG. 4. The weightings applied to the resistors 75 through 94 will be those necessary to produce a network function corresponding to that of the desired filter. Thus in FIG. 4, waveform A represents the output response of a narrow band pass filter. When it is desired to create a filter of this type with the apparatus in FIG. 1, the weightings applied to each of the delayed signals recovered through delay taps 52 through 71 are adjusted by adjusting resistors 75 through 94 so that the total output response of the system to an impulse is a waveform similar to waveform A. Each resistor in this system is set so that its resistance is proportional to the amplitude of the desired output response at a point during the response corresponding to the position of the sampling circuit associated with that resistor in the series of sampling circuits. The setting of resistor 78, associated with sampling circuit 21, would thus correspond to the amplitude of the desired output response at point 95 on waveform A. The setting of resistor 77, which is associated with the next succeeding sampling circuit 22, would correspond to the amplitude of the output response at point 96. In similar manner, the entire output response is set into resistors 75 through 94 by adjusting their individual settings. The effect of this is that any short term impulse applied to the system is multiplied by the network response represented by the resistor settings to produce an output response equivalent to that which would have been obtained had the input signal been passed through a network having such a network effect.

As the frequency of the input signal source 11 in FIG. 1 changes and the rate at which voltage samples are taken changes correspondingly, the network effect represented by the settings of resistors 75 through 94 is in effect changed with respect to time. An increase in the dominant frequency of the input signal results in an increase in sampling rate and a higher frequency network effect, such as that shown as waveform B in FIG. 4. A reduction in the dominant frequency of the input signal in like manner produces a lower frequency network response. The network response of the system thus automatically and continuously changes with the frequency of the dominant components of the input signal. The effect of this change in output response is a continuous shifting of the filter spectrum with time so that the filter is always centered on the dominant frequency of the input signal. This automatic centering of the filter spectrum permits the filtering of input signals whose dominant frequency varies over ranges too broad to be filtered by conventional methods without sacrificing frequency discrimination.

The method and apparatus of the invention are not limited to any particular filtering operation and may be employed to create notch or band reject filters as well as band pass filters. It is therefore often necessary to change the weightings applied to the resistors employed in the system. As mentioned earlier, there may in some cases be 250 or more separate delay taps and resistors in such a filter. Changes in the weightings of such a large number of resistors require considerable time if carried out with potentiometers, switches, or by patch board programming methods. To avoid this difficulty, the use of commercially available card programmed switches or similar automatic means to accomplish the weighting and mixing is desirable. The use of such means makes it possible to change the weightings of the various resistors very rapidly. Using card programmed switches, for example, the weightings of 20 or more separate delayed output stages can be set in steps of 1% or less by simply inserting a punched file card having holes therein in a prearranged pattern. The programmed switches are placed at the intersections of vertical and horizontal leads which are interconnected by an appropriate mixing resistor string. Any vertical lead and any horizontal lead in the network may be tied together by simply punching a hole in the programming card at the intersection point. The use of such switches and program cards will be readily apparent to those skilled in the art.

It will be understood that many modifications in the method and apparatus disclosed herein may be made without departing from the scope of the invention. Numerous gate generator and sampling circuits aside from those specifically described may be employed. The sampling circuits and associated components may be prearranged in groups, if desired, and interconnected by means of patch cords if units having a larger number of stages are needed. These and other modifications of similar character will be apparent to those skilled in the art.

What is claimed is:

1. Apparatus for tracking and filtering the dominant frequency in a complex electrical signal which comprises in combination means for generating control pulses at a frequency proportional to but at least twice as high as the dominant frequency in said complex signal; a plurality of sampling devices sequentially responsive to said control pulses, each of sampling devices including means for holding each voltage sample until the next succeeding voltage sample is taken; means for passing said complex signal through said sampling devices in sequence; means for recovering output signals from said sampling devices; means for weighting said output signals in accordance with a predetermined filter network response; and means for mixing said weighted output signals.

2. Apparatus as defined by claim 1 wherein said means for generating said control pulses comprises a frequency modulation discriminator, a pulse generator having a repetition rate proportional to the output voltage from said discriminator, and a sequence-operated counting device responsive to pulses from said pulse generator.

3. Apparatus as defined by claim 1 wherein each of said sampling devices comprises four triodes, two resistors and a capacitor connected to form two cathode follower stages.

4. Apparatus as defined by claim 1 wherein said means for weighting said output signals comprises a plurality of variable resistors.

5. Apparatus for tracking and filtering the dominant frequency in a complex electrical signal which comprises in combination a frequency modulation discriminator provided with input terminals for introducing said complex signal into said discriminator; a pulse generator responsive to the output voltage from said discriminator, said generator having a repetition rate greater than the highest frequency in said complex signal; a sequence-operated counting device for producing output control pulses in response to input pulses from said pulse generator; a plurality of sampling devices sequentially responsive to said control pulses from said counting device, each of said sampling devices including means for holding each voltage sample until the next succeeeding voltage sample is taken; means for passing said complex signal through said sampling devices in sequence; output taps from said sampling devices; and means for weighting and mixing signals derived from said output taps in accordance with a predetermined filter network response.

6. Apparatus as defined by claim 5 wherein said frequency modulation discriminator comprises a limiter, a monostable multivibrator connected to the output terminals of said limiter, and a low pass filter amplifier connected to the output terminals of said multivibrator.

7. Apparatus as defined by claim 5 wherein said pulse generator comprises an astable multivibrator.

8. Apparatus as defined by claim 5 including an amplifier connected between two of said sampling devices.

9. Apparatus as defined by claim 5 wherein said means for weighting and mixing said signals from said output taps comprises a mixing resistor string.

10. Apparatus for filtering a complex electrical signal which comprises in combination a plurality of sampling devices connected in cascade to permit the sequential sampling of an input complex signal, said sampling devices including means for holding each voltage sample until the next succeeding sample is taken; means for actuating said sampling devices in sequence at a frequency proportional to but at least twice the dominant frequency of said complex signal; means for recovering delayed voltage samples from said sampling devices; means for weighting said voltage samples in accordance with a predetermined filter network response; and means for mixing the weighted voltage samples.

References Cited in the file of this patent

UNITED STATES PATENTS

| | | |
|---|---|---|
| 2,294,863 | Hadfield | Sept. 1, 1942 |
| 2,553,284 | Sunstein | May 15, 1951 |
| 2,651,718 | Levy | Sept. 8, 1953 |
| 2,878,999 | Lindsey et al. | Mar. 24, 1959 |
| 2,921,738 | Greening | Jan. 19, 1960 |
| 2,953,645 | Schroeder | Sept. 20, 1960 |